(12) United States Patent
Jeong et al.

(10) Patent No.: US 9,880,275 B2
(45) Date of Patent: Jan. 30, 2018

(54) RADAR FOR VEHICLE AND METHOD OF OPERATING THE SAME

(71) Applicant: MANDO CORPORATION, Pyeongtaek-si (KR)

(72) Inventors: Seong Hee Jeong, Yongin-si (KR); Jae Eun Lee, Seoul (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 471 days.

(21) Appl. No.: 14/455,823

(22) Filed: Aug. 8, 2014

(65) Prior Publication Data

US 2015/0042507 A1 Feb. 12, 2015

(30) Foreign Application Priority Data

Aug. 8, 2013 (KR) .......................... 10-2013-0094303

(51) Int. Cl.
*G01S 13/93* (2006.01)
*G01S 13/00* (2006.01)
(Continued)

(52) U.S. Cl.
CPC ........... *G01S 13/003* (2013.01); *B60W 30/09* (2013.01); *B60W 30/14* (2013.01); *G01S 7/02* (2013.01);
(Continued)

(58) Field of Classification Search
CPC ..................................................... G01S 13/003
(Continued)

(56) References Cited

U.S. PATENT DOCUMENTS 6,580,385 B1 * 6/2003 Winner ................. G01S 7/4972
180/169
7,518,545 B2 * 4/2009 Minichshofer ....... G01S 13/931
342/59
(Continued)

FOREIGN PATENT DOCUMENTS

CN 102135616 7/2011
CN 102680963 9/2012
(Continued)

OTHER PUBLICATIONS

Office Action dated Apr. 11, 2016 for Chinese Patent Application No. 201410389332.3.

*Primary Examiner* — Marcus E Windrich
(74) *Attorney, Agent, or Firm* — Ladas & Parry, LLP (57) ABSTRACT

Disclosed herein is a vehicle radar. The radar may include Tx antennas for a middle range, Tx antennas for a short range, Rx antenna columns for a middle range each configured to have a long shape vertically and be horizontally disposed, Rx antenna columns for a short range each configured to have a long shape vertically and be disposed between some of the Rx antenna columns for a middle range, and a control unit configured to process signals of radio waves that are reflected from a specific object after the radio waves are radiated by the Tx antennas for the middle range and that are received by the Rx antenna columns for the middle range or signals of radio waves that are reflected from a specific object after the radio waves are radiated by the Tx antennas for the short range and that are received by the Rx antenna columns for the short range.

11 Claims, 7 Drawing Sheets

(51) Int. Cl.
*B60W 30/09* (2012.01)
*B60W 30/14* (2006.01)
*G01S 7/02* (2006.01)
*G01S 13/34* (2006.01)

(52) U.S. Cl.
CPC .......... G01S 13/345 (2013.01); G01S 13/931 (2013.01); *G01S 2013/9375* (2013.01)

(58) Field of Classification Search
USPC .................................................. 342/70–72
See application file for complete search history.

(56) References Cited

U.S. PATENT DOCUMENTS

| | | | | |
|---|---|---|---|---|
| 8,405,541 B2* | 3/2013 | Lee | ..................... | G01S 13/0209 342/118 |
| 2003/0112172 A1 | 6/2003 | Shinoda et al. | | |
| 2006/0012511 A1* | 1/2006 | Dooi | ......................... | G01S 7/02 342/70 |
| 2008/0136702 A1* | 6/2008 | Tsuchihashi | ............ | G01S 13/34 342/27 |
| 2008/0258964 A1* | 10/2008 | Schoeberl | ............... | G01S 7/032 342/189 |
| 2009/0201194 A1* | 8/2009 | Winkler | .................... | G01S 7/35 342/146 |
| 2010/0194629 A1* | 8/2010 | Craig | ..................... | H01Q 1/288 342/354 |
| 2010/0295721 A1* | 11/2010 | Focke | ..................... | G01S 13/10 342/70 |
| 2011/0074621 A1* | 3/2011 | Wintermantel | ......... | G01S 7/032 342/70 |
| 2011/0163909 A1* | 7/2011 | Jeong | ................. | G01S 13/4463 342/70 |
| 2012/0235857 A1* | 9/2012 | Kim | ....................... | G01S 13/345 342/134 |

FOREIGN PATENT DOCUMENTS

JP    2000-258524      9/2000
KR    10-2009-0067990  6/2009

* cited by examiner

(a) Tx 1 channel, Rx 4 channels (0.5 λ)

[FIG. 3B]

(b) Tx 1 channel, Rx 6 channels (0.5 λ)

[FIG. 3C]

[C] Tx 1 channel, Rx 12 channels (0.5 λ)

RADAR FOR VEHICLE AND METHOD OF OPERATING THE SAME

CROSS-REFERENCE TO RELATED APPLICATIONS

This application claims the benefit of Korean Patent Application No. 10-2013-0094303 filed on Aug. 8, 2013, with the Korean Intellectual Property Office, the disclosure of which is incorporated in its entirety herein by reference.

BACKGROUND OF THE INVENTION

Field of the Invention

Exemplary embodiments of the present invention relate to a radar apparatus, and more particularly, to a radar apparatus capable of supporting all of a short range function and middle and LRR functions, which is configured to support all the short and middle and LRR functions through a single apparatus or system configuration and to have most of the elements of the radar apparatus implemented on a single chip, thereby being capable of achieving miniaturization, high density integration and lower power.

Description of the Related Art

Recently, research continues to be carried out on a short range and high resolution radar in millimeter and sub-millimeter bands according to an increase in the demand for the short range and high resolution radar. A high-resolution radar system capable of determining or resolving the distance between adjacent objects is used for industrial and military purposes in various ways. A vehicle radar system is chiefly used in real life. The vehicle radar system is an essential technology for implementing an intelligent transportation system may be called a safe driving system for a vehicle that has been developed in order to prevent an accident that may occur due to poor weather conditions or a driver's carelessness by detecting a motion of another vehicle or object that moves or stops within a radius of about 250 m or less.

A conventional high-resolution radar system detects objects in various directions by scanning the objects using a precise mechanical device in order to obtain high space resolution within a small field of view. In such a radar system, a multi-beam antenna capable of electrical scanning and a digital beamforming technology are instead used because a corresponding mechanical device is increased if the number of antennas is increased in order to increase space resolution. For this reason, the conventional high-resolution radar system is chiefly applied to a small radar for a vehicle.

A vehicle radar technology may be classified into a Long Range Radar (LLR) capable of detecting an object within about 250 m or less and a Short Range Radar (SRR) capable of detecting an object within 60 m or less. A frequency of a 77 GHz band is chiefly used in the LRR, and a frequency of a 24 GHz band is chiefly used in the SRR.

For example, an existing vehicle radar configured to perform both an Adaptive Cruise Control (ACC) function and a Stop & Go function and applied to an application for front collision warning and prevention (e.g., an Automatic Emergency Brake (AEB)) has a configuration in which radar sensors for a short range and a radar sensor for middle/long ranges are separated and installed, as illustrated in FIG. 1. In such a combined ACC and AEB system, the middle and LRR for ACC performs a collision warning and prevention function by detecting a traffic line ahead of a section of 0~200 m along which a vehicle being driven travels, and the SRRs for an AEB perform a collision warning and prevention function by detecting vehicles that break into traffic lines ahead of a section of 0~60 m along which the vehicle being driven travels.

There is recently proposed an integrated radar for a short range and middle/long ranges, wherein the radar sensors for a short range and the radar sensor for middle/long ranges separated as described above are integrated as illustrated in FIG. 2.

In the conventional vehicle radar apparatus, however, LRR mode characterized by a relatively long detection range and a narrow field of view and SRR mode characterized by a short detection range and a wide field of view depending on their uses are limitedly applied to a single apparatus or system.

PRIOR ART DOCUMENT

Patent Document (Patent Document 1) Korean Patent Application Publication No. 2009-0067990

SUMMARY OF THE INVENTION

A first object of the present invention is to provide an integrated vehicle radar for a short range and middle/long ranges, which is capable of reducing an implementation area.

A second object of the present invention is to provide an integrated vehicle radar for a short range and middle/long ranges having a high reception sensitivity.

In accordance with an aspect of the present invention for achieving the objects of the present invention, a radar for a vehicle may include Tx antennas for a middle range, Tx antennas for a short range, Rx antenna columns for a middle range each configured to have a long shape vertically and be horizontally disposed, Rx antenna columns for a short range each configured to have a long shape vertically and be disposed between some of the Rx antenna columns for the middle range, and a control unit configured to process signals of radio waves that are reflected from a specific object after the radio waves are radiated by the Tx antennas for the middle range and that are received by the Rx antenna columns for the middle range or signals of radio waves that are reflected from a specific object after the radio waves are radiated by the Tx antennas for the short range and that are received by the Rx antenna columns for the short range.

In this case, Rx antennas included in each of the Rx antenna columns for the middle range and each of the Rx antenna columns for the short range are vertically arranged.

The radar for a vehicle may further include a transmission circuit configured to supply power for transmitting Tx radio waves to the Tx antennas for the middle range or the Tx antennas for the short range in response to an instruction from the control unit and a Tx switch unit configured to selectively connect the Tx antennas for the middle range or the Tx antennas for the short range and the transmission circuit in response to an instruction from the control unit.

The radar for a vehicle may further include a reception circuit configured to demodulate the signals received by Rx antennas for the middle range or Rx antennas for the short range and to transfer the demodulated signals to the control unit and an Rx switch unit configured to selectively connect the Rx antennas for the middle range or the Rx antennas for the short range and the transmission circuit in response to an instruction from the control unit.

In this case, Rx antenna columns for the long range that do not overlap with the Rx antenna columns for the short range may be grouped every two or more, the grouped Rx antenna columns may be connected to a single reception line, and Rx antenna columns for the long range that overlap with the Rx antenna columns for the short range may be connected to respective reception lines.

In this case, the control unit may be configured to control the Tx antennas for the middle range so that the Tx antennas radiate Tx radio waves in a first time interval and to control the Tx antennas for the short range so that the Tx antennas radiate Tx radio waves in a second time interval.

In this case, the control unit is configured to group the signals, received by the Rx antenna columns for a long range that overlap with the Rx antenna columns for the short range, every two or more, to process the grouped signals in the interval in which the Tx radio waves for the middle range are radiated, and to process each of the signals received by the Rx antenna columns for the short range in the interval in which the Tx radio waves for the short range are radiated.

In accordance with another aspect of the present invention for achieving the objects of the present invention, a method of operating a radar for a vehicle, including Tx antennas for a middle range, Tx antennas for a short range, Rx antenna columns for a middle range each configured to have a long shape vertically and be horizontally disposed, and Rx antenna columns for a short range each configured to have a long shape vertically and be horizontally disposed. The method may include connecting the Tx antennas for the middle range to transmission lines, tracking a middle range object based on signals of radio waves that have been reflected from a specific object after the radio waves are radiated by the Tx antennas for the middle range and that have been received by the Rx antenna columns for the middle range, connecting the Tx antennas for the short range to an output line, and tracking a short range object based on signals of radio waves that have been reflected from a specific object after the radio waves are radiated by the Tx antennas for the short range and that have been received by the Rx antenna columns for the short range.

In this case, tracking the middle range object may include performing Adaptive Cruise Control (ACC).

In this case, tracking the short range object may include performing a stop & go function for preventing a short range collision.

In this case, tracking the middle range object may include grouping signals, received by Rx antenna columns for the long range that overlap with the Rx antenna columns for the short range, every two signals and processing the grouped signals, and tracking the middle range object may include processing each of signals received by the Rx antenna columns for the short range.

In this case, Rx antennas may be vertically arranged in each of the Rx antenna columns for the middle range and each of the Rx antenna columns for the short range.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, some exemplary embodiments of the present invention are described in detail with reference to the accompanying drawings.

Figure 1A:
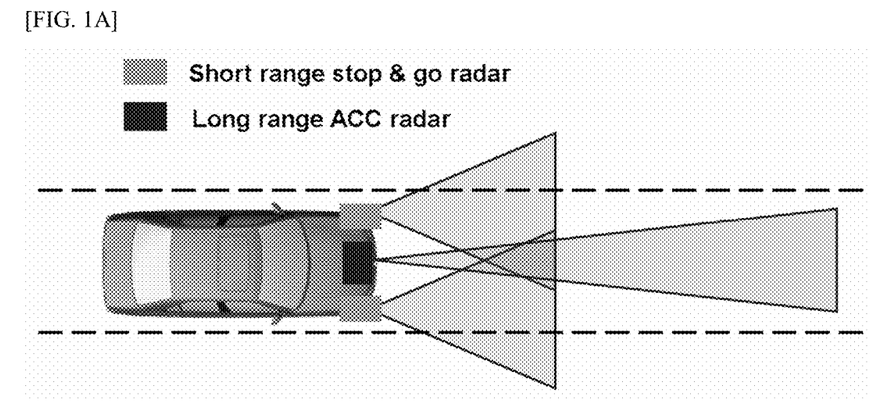
FIGS. 1A and 1B are conceptual diagrams illustrating the installation structure and operating principle of an SRR and a middle range radar for a vehicle.
Figure 1B:
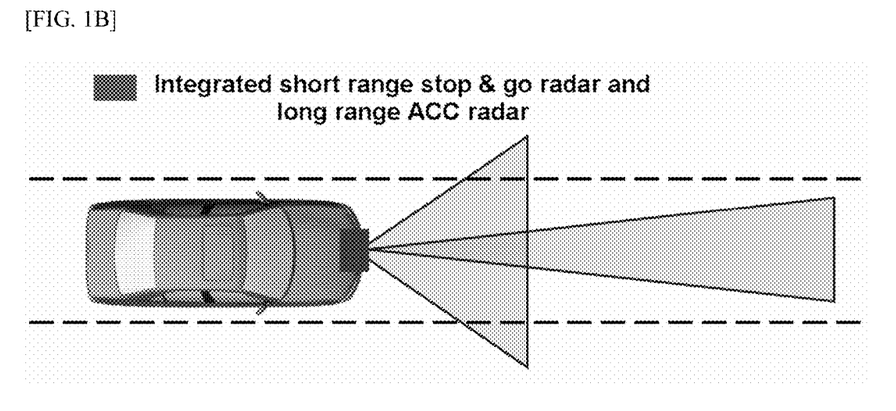

FIGS. 1A and 1B are conceptual diagrams illustrating the installation structure and operating principle of an SRR and a middle range radar for a vehicle.

A single middle range radar and two SRRs are independently installed in a vehicle illustrated in FIG. 1A. A task for tracking a vehicle being driven ahead, which is necessary for ACC, may be performed using the middle range radar installed in the center of the front of the vehicle, and a task for tracking adjacent vehicle, which is necessary for an AEB, may be performed using the SRRS installed at both ends of the front of the vehicle.

A radar in which a middle range radar and an SRR are integrated is installed at the front of the vehicle illustrated in FIG. 1B.

Figure 2:
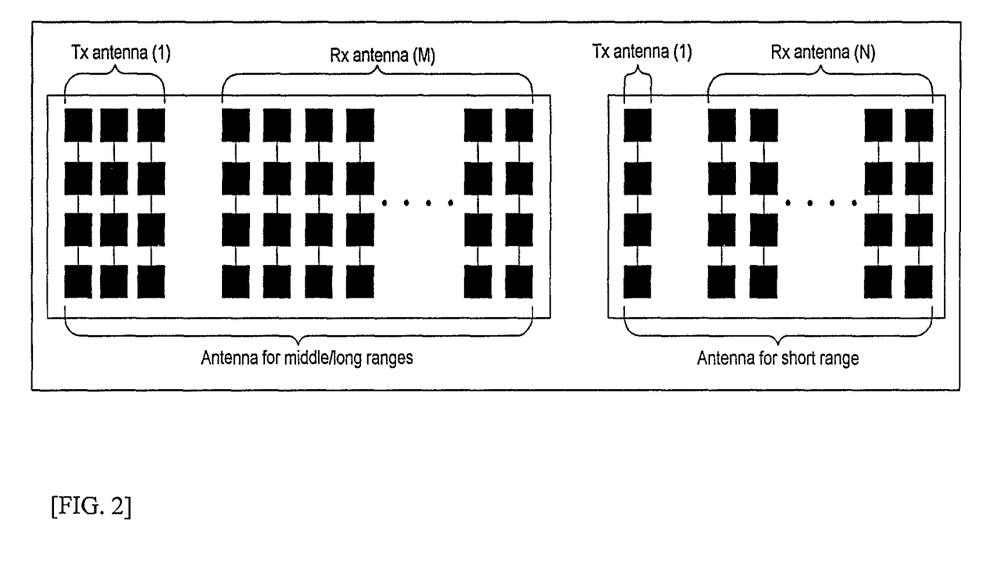
FIG. 2 is a plan view illustrating the antenna module of an integrated radar in which Tx and Rx antennas for a middle range radar and Tx and Rx antennas for an SRR are simply gathered in a single substrate.

FIG. 2 is a plan view illustrating the antenna module of an integrated radar in which Tx and Rx antennas for a middle range radar and Tx and Rx antennas for an SRR are simply gathered in a single substrate.

The antenna module of the integrated radar illustrated in FIG. 2 is classified into a region in which the Tx and Rx antennas for a middle range are disposed and a region in which the Tx and Rx antennas for a short range are disposed. Each of the Tx and Rx antennas for middle and short ranges may be implemented using an array antenna in which antenna elements are disposed in an array form. The antenna structure of the integrated radar illustrated in FIG. 2 does not have a significant area reduction effect attributable to the integration of the antennas, and has a disadvantage in that an antenna area is increased if angular resolution or the number of channels is increased.

The antenna of FIG. 2 forms an array structure in which antenna columns in each of which antenna elements are vertically disposed are horizontally arrayed.

In a single antenna column, the antenna elements that are vertically disposed are coupled by a single line, and they look like a single antenna element in an external reception circuit or a transmission circuit.

Figure 3A:
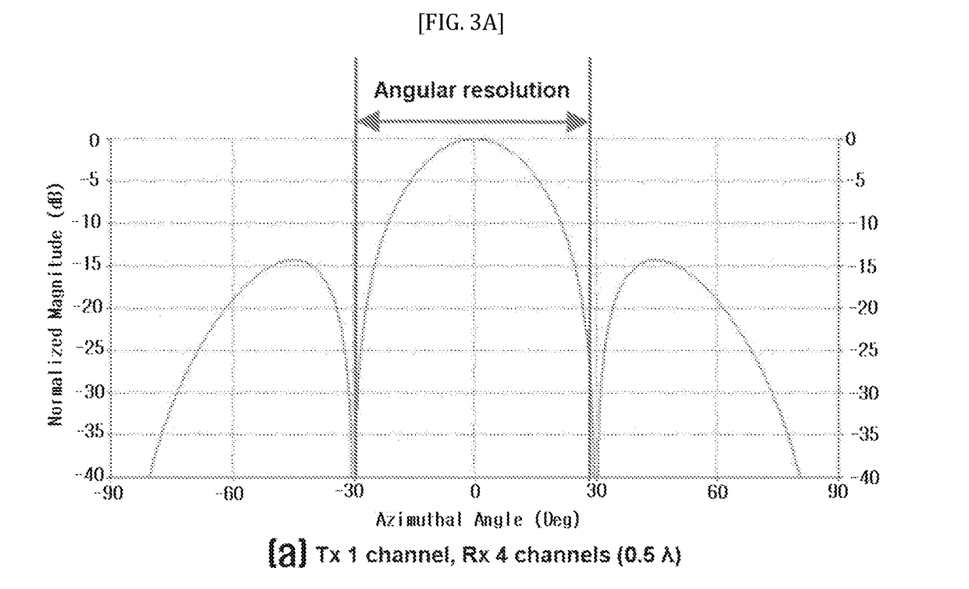
FIGS. 3A to 3C are graphs illustrating a change in the angular resolution according to the number of antenna channels when an Rx antenna distance is $0.5\lambda$.
Figure 3B:
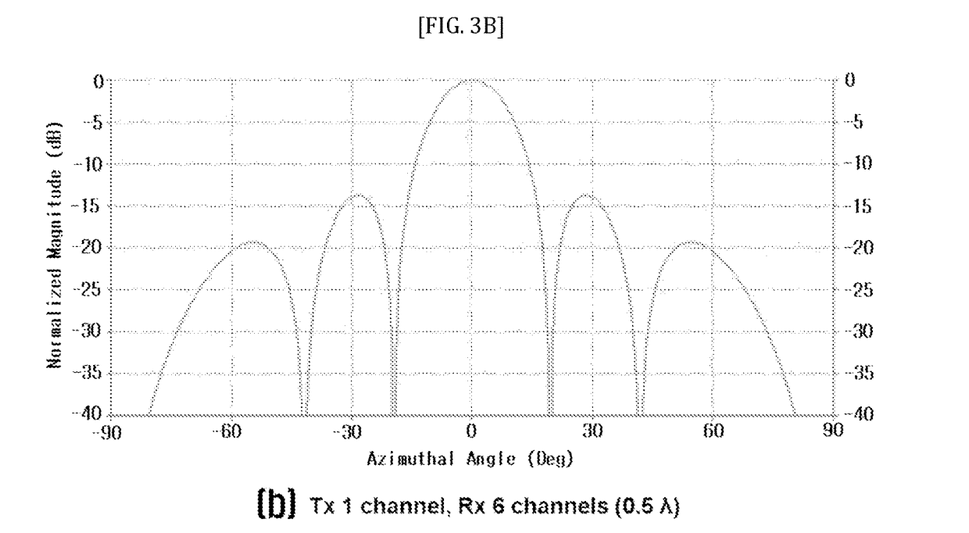
Figure 3C:
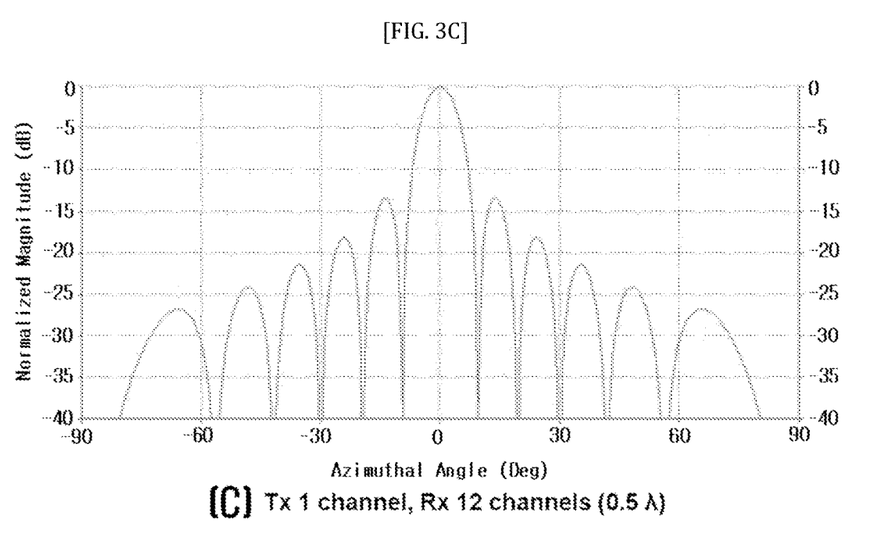

If a single Tx channel and a plurality of Rx channels are provided and the distance between antenna columns is constant, for example, $0.5\lambda$, the relationship between the number of channels of the Rx antennas, the distance between the channels of the Rx antennas, and angular resolution has a tendency, such as Equation 1 and graphs of FIGS. 3A to 3C. FIGS. 3A to 3C are graphs illustrating a change in the angular resolution according to the number of antenna channels when an Rx antenna distance is 0.5λ. From FIG. 3, it may be seen that an antenna field of view becomes narrow and angular resolution is increased according to an increase of the number of Rx channels.

$$\text{Angular resolution} = \frac{2.782}{\pi |N| k} \quad (1)$$

In Equation 1, N is the number of Rx antennas, and k is the distance between the antennas (λ).

Figure 4:
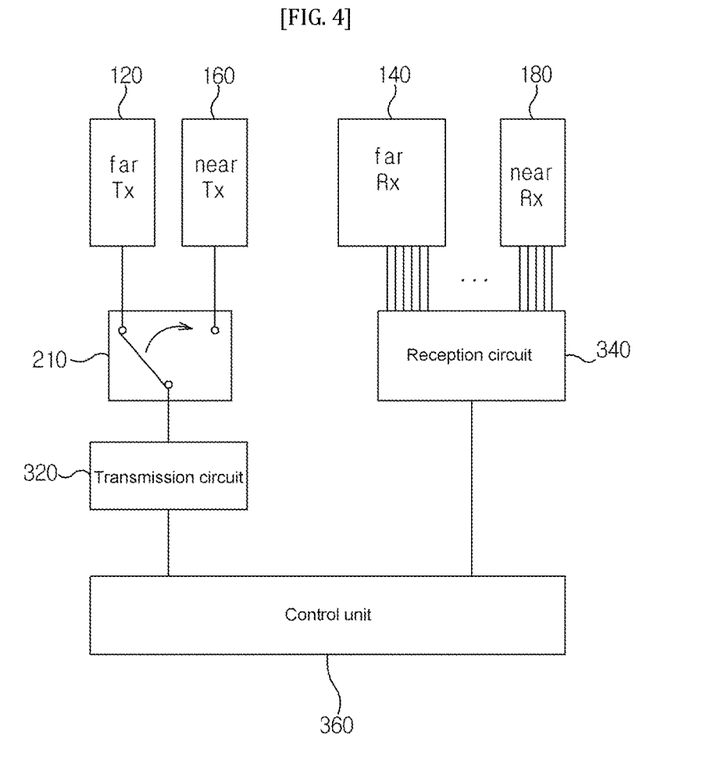
FIG. 4 is a block diagram illustrating an integrated middle and SRR for a vehicle in accordance with an embodiment of the present invention.

FIG. 4 is a block diagram illustrating an integrated middle and SRR for a vehicle in accordance with an embodiment of the present invention. Middle and long ranges have a concept which contrasts with a short range. In the present invention, an implementation direction is to integrate an SRR and a middle range radar/an LRR. In the description of the present invention, middle/long ranges may be considered to be a concept which simply contrasts with a short range, and a middle range radar (or antenna) and an LRR may be simply expressed by a middle range radar (or antenna).

The illustrated vehicle radar includes Tx antennas 120 for a middle range, Tx antennas 160 for a short range, Rx antenna columns 140 for a middle range each configured to have a long shape vertically and horizontally disposed, Rx antenna columns 180 for a short range each configured to have a long shape vertically and disposed between some of the Rx antenna columns 140 for a middle range, and a control unit 360 configured to process signals of radio waves that have been reflected from a specific object after the radio waves are radiated by the Tx antennas 120 for a middle range and that have been received by the Rx antenna columns 140 for a middle range or signals of radio waves that have been reflected from a specific object after the radio waves are radiated by the Tx antennas 160 for a short range and that have been received by the Rx antenna columns 180 for a short range.

The Rx antenna columns 180 for a short range may be defined to include some of the Rx antenna columns 140 for a middle range, which will be described later.

Furthermore, a transmission circuit 320 configured to supply power for transmitting a Tx radio wave to the Tx antennas 120 for a middle range or the Tx antennas 160 for a short range in response to an instruction from the control unit 360 and a Tx switch unit 210 configured to selectively couple the Tx antennas 120 for a middle range or the Tx antennas 160 for a short range and the transmission circuit 320 in response to an instruction from the control unit 360 may be provided between the Tx antennas 120 and 160 middle and short ranges and the control unit 360.

Furthermore, a reception circuit 340 configured to demodulate signals received from the Rx antenna columns 140 for a middle range or the Rx antenna columns 180 for a short range and to transfer the demodulated signals to the control unit 360 and an Rx switch unit (not illustrated) configured to selectively couple the Rx antenna columns 140 for a middle range or the Rx antenna columns 180 for a short range and the reception circuit 340 in response to an instruction from the control unit 360 may be provided between the Rx antenna columns 140 and 180 for middle and short ranges and the control unit 360.

The control unit 360 illustrated in FIG. 4 controls the Tx antennas 120 for a middle range so that they radiate a Tx radio wave in one time interval in which the Tx antennas 120 operate as middle range radars (or antennas), and controls the Tx antennas 160 for a short range so that they radiate Tx radio waves in the other time interval in which the Tx antenna 160 operate as SRRs (or antennas). For example, the time interval may be spit so that the role of the middle range radar and the role of the SRR are alternately performed.

Figure 5A:
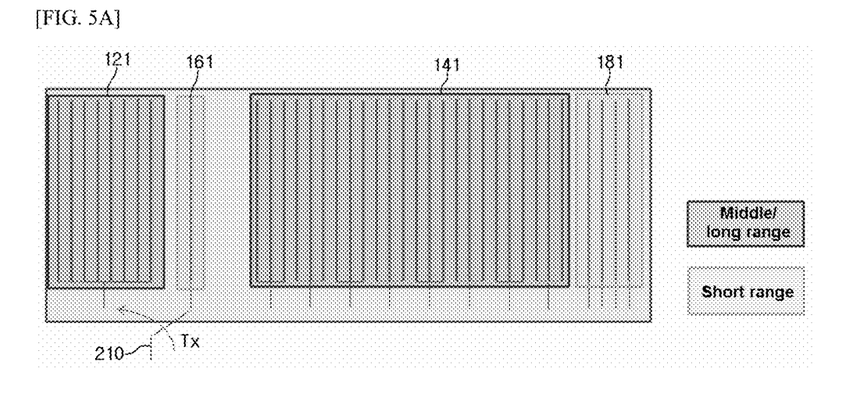
FIGS. 5A and 5B are block diagrams illustrating an embodiment of the antenna module included in the vehicle radar of FIG. 4.
Figure 5B:
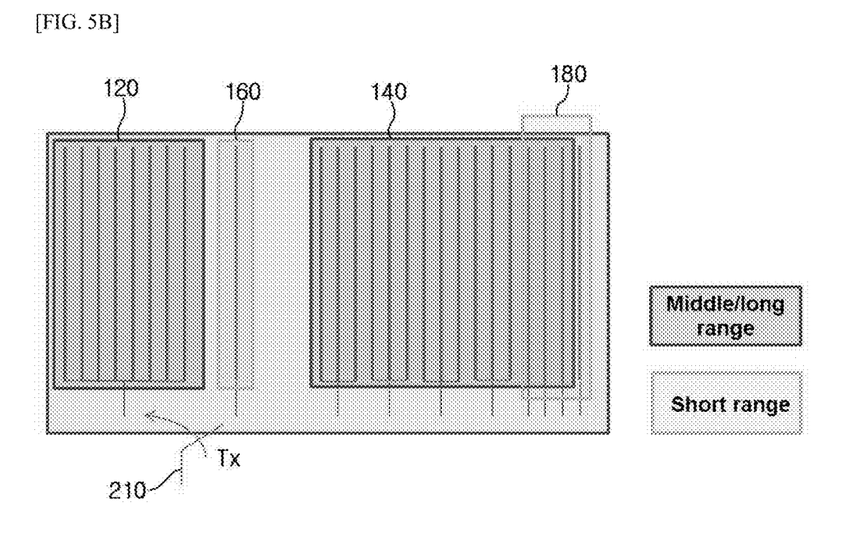

FIGS. 5A and 5B are block diagrams illustrating an embodiment of the antenna module included in the vehicle radar of FIG. 4. In the antenna module of the vehicle radar illustrated in FIG. 5A, it is assumed that the interval between Rx antennas for a short range is 0.5λ, and the interval between the Rx antennas for a middle range is 0.5λ. It may be seen that the Rx antennas for a middle range form columns at the interval of 0.5λ, and every three columns are coupled by a single transmission line. In such a case, there is an advantage in that a process of fabricating the Rx antenna columns for a short range and a process of fabricating the Rx antenna columns for a middle range can be integrated and the sensitivity of the Rx antennas for a middle range can be increased.

In the antenna module of the vehicle radar illustrated in FIG. 5B, some of Rx antennas for a short range and Rx antennas for a middle range are integrated in such a way as to overlap with each other.

The antenna module of the radar illustrated in FIGS. 5A and 5B adopts a scheme for additionally generating the reception channel of an LRR using the reception channel signal of a middle range radar when the LRR is implemented in order to prevent the reduction of a gain that occurs because the number of channels of an LRR is reduced so as to reduce the size of an integrated radar and in order to reduce the degree that angular resolution is deteriorated due to the increase of a beam width. If the number of reception channels is increased as described above, there are advantages in that the gain of a received signal is increased and a Signal to Noise Ratio (SNR) can be improved. Furthermore, angular resolution can be improved because a beam width becomes sharper according to an increase in the number of reception channels.

Figure 6:
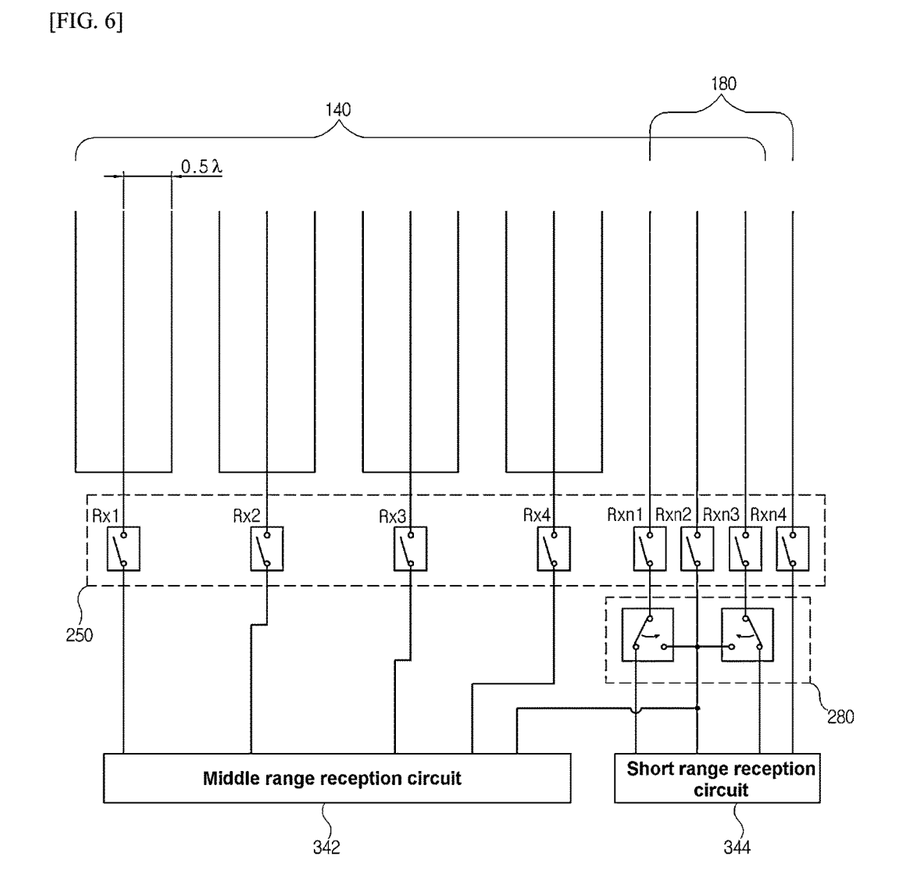
FIG. 6 is a block diagram illustrating an embodiment of an antenna module included in the vehicle radar of FIG. 4.

FIG. 6 is a detailed diagram of Rx antenna parts if the antenna module of the vehicle radar of FIG. 5B is included in the vehicle radar of FIG. 4.

The antenna module illustrated in FIGS. 5B and 6 includes the Tx antennas 120 for a middle range, the Tx antennas 160 for a short range, an Rx antenna block 140 for a middle range configured to include Rx antenna columns for a middle range that have a long shape vertically and that are horizontally disposed, and an Rx antenna block 180 for a short range configured to include some of the Rx antenna columns for a middle range and Rx antenna columns for a short range that have a long shape vertically and that that are disposed between the some antenna columns.

Each of the Rx antenna columns for a middle range that form the Rx antenna block 160 for a middle range and the Rx antenna columns for a short range that form the Rx antenna block 180 for a short range may be implemented using array radars in which Rx antennas each having a square shape, such as that of FIG. 2, are vertically arranged.

In the illustrated antenna module, Rx antenna columns for a long range that do not overlap with the Rx antenna columns for a short range are grouped every three Rx antenna columns, and each of the Rx antenna column groups is connected to a single reception line. Rx antenna columns for a long range that overlap with the Rx antenna columns for a short range are coupled to respective single reception lines. In such a case, there is an advantage in that the antenna distance of Equation 1 can be increased by the width of three antenna columns (e.g., 1.5λ) because the three Rx antenna columns for a long range connected to a single reception line are recognized as a single antenna column in the reception circuit. Furthermore, there is an advantage in that reception sensitivity can be improved because the antennas of three columns are connected to a single reception line.

Rx antenna columns for a long range that overlap with the Rx antenna columns for a short range are connected to respective reception lines. This is for preparing for a case where the antenna columns are used as Rx antennas for a short range. That is, if the antenna columns are used as Rx antennas for a short range, the columns have a width of 0.5λ, in the antenna distance of Equation 1.

In contrast, if the Rx antenna columns for a long range that overlap with the Rx antenna columns for a short range are used as Rx antennas for a long range, every three antenna columns need to perform a reception operation as if they are connected to a single reception line. To this end, the antenna module may be implemented to include switches in hardware, or may be implemented in software.

For example, as illustrated in FIG. 6, the reception lines of the left/right antenna columns of three Rx antenna columns for a long range that overlap with the Rx antenna columns for a short range may include switches 280 for switching the reception lines of the left/right antenna columns to the reception line of the central antenna column, and vice versa. If the left/right antenna columns of the three Rx antenna columns are used as Rx antennas for a short range, the switches 280 are placed at locations where they maintain the reception lines of the respective columns without change. If the left/right antenna columns of the three Rx antenna columns are used as Rx antennas for a middle range, the switches 280 are placed at locations where they connect the reception lines of the left/right antenna columns to the reception line of the central antenna column. It may be seen that the antenna module of FIG. 6 further includes switches Rxn1~Rxn configured to selectively connect the Rx antenna columns for middle and short ranges to a middle range reception circuit 342 or a short range reception circuit 344.

Furthermore, in the case of a software implementation, separate switches may not be used. In such a case, in an interval in which Tx radio waves for a middle range are radiated and Rx antennas for a middle range are used, signals received by the Rx antenna columns for a long range that overlap with the Rx antenna columns for a short range may be grouped every three signals, and the three signals may be merged into a single signal and processed. Furthermore, in an interval in which Tx radio waves a short range and Rx antennas for a short range are used, each of signals received by the Rx antenna columns for a short range may be processed.

The illustrated Tx antenna columns for a middle range in each of which Tx antennas each having a square shape are vertically arranged horizontally, and the transmission lines of the respective columns are configured to be coupled by one. The Tx antennas for a short range implement the Tx antenna columns for a short range in each of which Tx antennas each having a square shape are vertically arranged.

Figure 7:
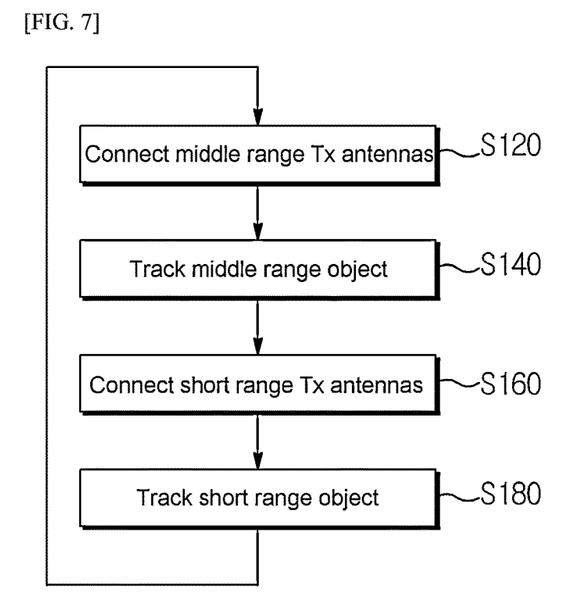
FIG. 7 is a flowchart illustrating an embodiment of a method of operating the vehicle radar of FIG. 4.

FIG. 7 is a flowchart illustrating an embodiment of a method of operating the vehicle radar of FIG. 4. The method of operating a vehicle radar may include connecting the Tx antennas for a middle range to the transmission lines at step S120, tracking a middle range object based on signals of radio waves that have been reflected from a specific object after the radio waves are radiated by the Tx antennas for a middle range and that have been received by the Rx antenna columns for a middle range at step S140, connecting the Tx antennas for a short range to an output line at step S160, and tracking a short range object based on signals of radio waves that have been reflected from a specific object after the radio waves are radiated by the Tx antennas for a short range and that have been received by the Rx antenna columns for a short range at step S180.

At step S140, ACC may be performed using the results of the tracking of the middle range object. At step S180, a stop & go function (or an AEB) for preventing a short range collision may be performed using the results of the tracking of the short range object.

At step S140 of tracking the middle range object, the signals received by the Rx antenna columns for a long range that overlap with the Rx antenna columns for a short range may be grouped every two or more signals (three signals in FIG. 6) and may be processed. At step S180 of tracking the middle range object, each of the signals received by the Rx antenna columns for a short range may be processed.

Figure 8:
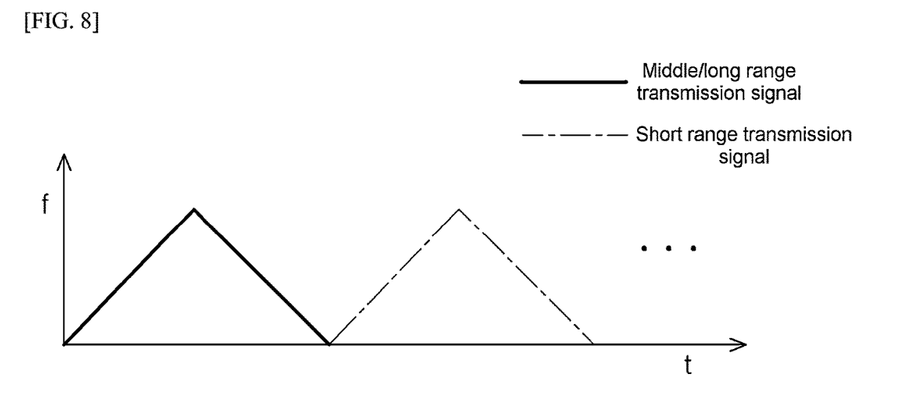
FIG. 8 is a graph illustrating the output section of a Tx signal whose time interval has been split if the role of a middle range radar and the role of an SRR are alternatively performed.

FIG. 8 is a graph illustrating the output section of a Tx signal whose time interval has been split if the role of a middle range radar and the role of an SRR are alternatively performed.

In the graph of FIG. 8, step S120 may be performed at the start point of a middle/long range transmission signal section indicated by a solid line, step S140 may be performed in the middle/long range transmission signal section.

Furthermore, in the graph of FIG. 8, step S160 may be performed at the start point of a short (or near) range transmission signal section indicated by a dotted line, and step S180 may be performed in the short (or near) range transmission signal section.

Only one middle/long range transmission signal section and one short (or near) range transmission signal section have been illustrated in the graph of FIG. 8, but a continuation of the sections that alternately appear is indicated by a dotted line, which is indicated by a circulation and repetition process in the flowchart of FIG. 7.

The integrated middle/long range radar for a vehicle according to an embodiment of the present invention is advantageous in that an area for implementing radar antennas can be reduced.

Furthermore, the present invention is advantageous in that the reception sensitivity of the integrated middle/long range radar for a vehicle can be improved.

While the present invention has been described with respect to the specific embodiments, it will be apparent to those skilled in the art that various changes and modifications may be made without departing from the spirit and scope of the invention as defined in the following claims.

What is claimed is:

1. A radar for a vehicle, comprising:
   Tx antennas for a middle range;
   Tx antennas for a short range;
   Rx antenna columns for a middle range each configured to have a long shape vertically and be horizontally disposed;
   Rx antenna columns for a short range each configured to have a long shape vertically and be disposed between some of the Rx antenna columns for the middle range; and
   a control unit configured to process signals of radio waves that are reflected from a specific object after the radio waves are radiated by the Tx antennas for the middle range and that are received by the Rx antenna columns for the middle range or signals of radio waves that are reflected from a specific object after the radio waves are radiated by the Tx antennas for the short range and that are received by the Rx antenna columns for the short range, wherein the Rx antenna columns for the middle range that overlap with the Rx antenna columns for the short range are configured to selectively connect to a middle range reception circuit or a short range reception circuit by switches, and wherein Rx antenna columns for the long range that do not overlap with the Rx antenna columns for the short range are grouped every two or more, and the grouped Rx antenna columns are connected to a single reception line, and Rx antenna columns for the long range that overlap with the Rx antenna columns for the short range are connected to respective reception lines.

2. The radar according to claim 1, wherein Rx antennas included in each of the Rx antenna columns for the middle range and each of the Rx antenna columns for the short range are vertically arranged.

3. The radar according to claim 1, further comprising:
a transmission circuit configured to supply power for transmitting Tx radio waves to the Tx antennas for the middle range or the Tx antennas for the short range in response to an instruction from the control unit; and
a Tx switch unit configured to selectively connect the Tx antennas for the middle range or the Tx antennas for the short range and the transmission circuit in response to an instruction from the control unit.

4. The radar according to claim 1, further comprising:
a reception circuit configured to demodulate the signals received by Rx antennas for the middle range or Rx antennas for the short range and to transfer the demodulated signals to the control unit; and
an Rx switch unit configured to selectively connect the Rx antennas for the middle range or the Rx antennas for the short range and the transmission circuit in response to an instruction from the control unit.

5. The radar according to claim 1, wherein the control unit is configured to control the Tx antennas for the middle range so that the Tx antennas radiate Tx radio waves in a first time interval and to control the Tx antennas for the short range so that the Tx antennas radiate Tx radio waves in a second time interval.

6. The radar according to claim 5, wherein the control unit is configured to:
group the signals, received by the Rx antenna columns for a long range that overlap with the Rx antenna columns for the short range, every two or more and process the grouped signals in the interval in which the Tx radio waves for the middle range are radiated, and
process each of the signals received by the Rx antenna columns for the short range in the interval in which the Tx radio waves for the short range are radiated.

7. A method of operating a radar for a vehicle, comprising Tx antennas for a middle range, Tx antennas for a short range, Rx antenna columns for a middle range each configured to have a long shape vertically and be horizontally disposed, and Rx antenna columns for a short range each configured to have a long shape vertically and be horizontally disposed, the method comprising:
selectively connecting the Tx antennas for the middle range or the Tx antennas for the short range to a transmission circuit;
tracking a middle range object based on signals of radio waves that have been reflected from a specific object after the radio waves are radiated by the Tx antennas for the middle range and that have been received by the Rx antenna columns for the middle range; and
tracking a short range object based on signals of radio waves that have been reflected from a specific object after the radio waves are radiated by the Tx antennas for the short range and that have been received by the Rx antenna columns for the short range,
wherein the Rx antenna columns for the short range are disposed between some of the Rx antenna columns for the middle range,
wherein the Rx antenna columns for the middle range that overlap with the Rx antenna columns for the short range selectively connect to a middle range reception circuit or a short range reception circuit by switches, and
wherein Rx antenna columns for the long range that do not overlap with the Rx antenna columns for the short range are grouped every two or more, and the grouped Rx antenna columns are connected to a single reception line, and Rx antenna columns for the long range that overlap with the Rx antenna columns for the short range are connected to respective reception lines.

8. The method according to claim 7, wherein tracking the middle range object comprises performing Adaptive Cruise Control (ACC).

9. The method according to claim 7, wherein tracking the short range object comprises performing a stop & go function for preventing a short range collision.

10. The method according to claim 7, wherein:
the tracking the middle range object comprises grouping signals, received by Rx antenna columns for the long range that overlap with the Rx antenna columns for the short range, every two signals and processing the grouped signals; and
the tracking the middle range object comprises processing each of signals received by the Rx antenna columns for the short range.

11. The method according to claim 7, wherein Rx antennas are vertically arranged in each of the Rx antenna columns for the middle range and each of the Rx antenna columns for the short range.

* * * * *